US012589859B2

(12) United States Patent
Yesilcimen et al.

(10) Patent No.: US 12,589,859 B2
(45) Date of Patent: Mar. 31, 2026

(54) DEVICE FOR ASSISTING WITH REGULATION OF PROPELLERS OF AERONAUTICAL TURBOMACHINERY

(71) Applicants: SAFRAN, Paris (FR); SAFRAN AIRCRAFT ENGINES, Paris (FR)

(72) Inventors: Henri Yesilcimen, Moissy Cramayel (FR); Anthony Binder, Moissy Cramayel (FR); Panagiotis Giannakakis, Moissy Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/715,425

(22) PCT Filed: Nov. 28, 2022

(86) PCT No.: PCT/FR2022/052186
§ 371 (c)(1),
(2) Date: May 31, 2024

(87) PCT Pub. No.: WO2023/099835
PCT Pub. Date: Jun. 8, 2023

(65) Prior Publication Data

US 2025/0083798 A1      Mar. 13, 2025

(30) Foreign Application Priority Data

Dec. 3, 2021    (FR) ...................................... 2112947

(51) Int. Cl.
*B64C 11/30* (2006.01)
*B64C 11/44* (2006.01)

(52) U.S. Cl.
CPC ............ *B64C 11/301* (2013.01); *B64C 11/44* (2013.01); *F05D 2270/44* (2013.01)

(58) Field of Classification Search
CPC ....... B64C 11/44; B64C 11/30; B64C 11/301; B64C 11/305
See application file for complete search history.

(56) References Cited

U.S. PATENT DOCUMENTS 6,735,500 B2 * 5/2004 Nicholas ................. B64C 27/56
                                                      701/1
6,879,885 B2 * 4/2005 Driscoll ................. B64D 31/06
                                                      73/527

(Continued)

FOREIGN PATENT DOCUMENTS

FR        3107925 A1     9/2021
WO    2020198814 A1    10/2020

OTHER PUBLICATIONS

International Patent Application No. PCT/FR2022/052186, International Search Report dated Mar. 21, 2023, 13 pages (2 pages of English translation and 11 pages of original document).

*Primary Examiner* — Justin D Seabe
(74) *Attorney, Agent, or Firm* — Kilpatrick Townsend & Stockton LLP

(57) ABSTRACT

This control device for a propulsion system, comprising means for calculating a blade-pitch setpoint of at least one propeller of the propulsion system, the calculation means using a performance predictive model of the propeller taking account of at least one flight speed for adapting a blade-pitch angle setpoint, is characterised in that the performance predictive model of the propeller is configured to use polar charts implemented in the form of a mathematical law.

11 Claims, 13 Drawing Sheets

(56)      References Cited

U.S. PATENT DOCUMENTS

| | | | |
|---|---|---|---|
| 9,745,051 B2 * | 8/2017 | Tantot | B64C 11/44 |
| 10,414,512 B2 * | 9/2019 | Luszcz | B64C 27/22 |
| 10,641,184 B2 * | 5/2020 | Wulff | F02C 9/28 |
| 10,717,545 B2 * | 7/2020 | El Haloui | G07C 5/0816 |
| 10,802,482 B2 * | 10/2020 | Bothwell | B64C 13/10 |
| 10,935,985 B2 * | 3/2021 | Irwin, III | G05D 1/042 |
| 2014/0023499 A1 | 1/2014 | Collingbourne | |
| 2021/0276692 A1 | 9/2021 | Hutchinson et al. | |

* cited by examiner

| RESET COEFFICIENT OF THE MATHEMATICAL FORMULATION OF THE POLAR CHART | | |
|---|---|---|
| CL125 vs AoA127 | | |
| Coefficient | Description | Order of magnitude |
| V0qUtip120des | Value of the parameter V0qUtip120 at the drawing point of the propeller | Specific to each propeller but quite close to 1 (comprised between 0.90 and 1.20) |
| $k1Cl_{BASE}$ | 1-order slope coefficient when the compressibility effect is zero | Comprised between 2 and 4<br><br>Nominal value between 2.5 and 3 |
| $k2Cl_{BASE}$ | 2-order slope coefficient when the compressibility effect is zero | Comprised between 1.5 and 2.5<br><br>Nominal value around 2 |
| $k3Cl_{BASE}$ | 3-order slope coefficient when the compressibility effect is zero | Comprised between -10 and 0<br><br>Nominal value around -5 |
| $AoACl0_{BASE}$ | Zero-lift angle of incidence when the compressibility effect and the 3D effects are zero | Comprised between -1deg and -4deg<br><br>Nominal value around -3.5deg |
| k1corrAoACl0 | 1-order coefficient for the 3D effects correcting the zero-lift angle of incidence | Comprised between -0.01 and 0.01<br><br>Nominal value around -0.01 |
| k2compAoACl0 | 2-order coefficient for the compressibility effects correcting the zero-lift angle of incidence | Comprised between -0.51 and 0.5<br><br>Nominal value around 0.30 |

FIG.15

| RESET COEFFICIENT OF THE MATHEMATICAL FORMULATION OF THE POLAR CHART | | |
|---|---|---|
| CD125 vs CL125 | | |
| Coefficient | Description | Order of magnitude |
| V0qUtipQdesMax | Max value of V0qUtipQdes beyond which there is no longer any 3D effect | Comprised between 2 and 3<br><br>Nominal value around 2.5 |
| $CLml_{BASE}$ | Lift coefficient at the minimum drag coefficient when there is no 3D effect | Comprised between 0.1 and 0.4<br><br>Nominal value around 0.25 |
| $CDml_{BASE}$ | Mini drag coefficient when there is no 3D effect | Comprised between 0 and 0.025<br><br>Nominal value around 0 |
| $kL_{BASE}$ | Slope coefficient on the sub-incidence side when there is no 3D effect | Comprised between 0.25 and 2<br><br>Nominal value around 0.75 |
| $kR_{BASE}$ | Slope coefficient on the over-incidence side when there is no 3D effect | Comprised between 0.05 and 1<br><br>Nominal value around 0.10 |
| $ExpL_{BASE}$ | Slope coefficient on the sub-incidence side when there is no 3D effect | Comprised between 0.1 and 1<br><br>Nominal value around 0.3 |
| $ExpR_{BASE}$ | Slope coefficient on the over-incidence side when there is no 3D effect | Comprised between 2 and 7<br><br>Nominal value around 5 |
| k1corrCLml | 1-order coefficient for the 3D effects correcting the lift coefficient at the minimum drag coefficient | Comprised between -0.01 and 0.01<br><br>Nominal value around 0 |
| k1corrCDml | 1-order coefficient for the 3D effects correcting the mini drag coefficient | Comprised between -0.1 and 0.1<br><br>Nominal value around 0 |
| k1corrKL | 1-order coefficient for the 3D effects correcting the slope coefficient on the sub-incidence side | Comprised between -0.2 and 0.2<br><br>Nominal value around 0.15 |
| k1corrKR | 1-order coefficient for the 3D effects correcting the slope coefficient on the over-incidence side | Comprised between -0.05 and 0.05<br><br>Nominal value around -0.05 |
| k1corrExpL | 1-order coefficient for the 3D effects correcting the slope exponent on the sub-incidence side | Comprised between -0.50 and 0.50<br><br>Nominal value around 0.50 |
| k1corrExpR | 1-order coefficient for the 3D effects correcting the slope exponent on the over-incidence side | Comprised between -0.5 and 0.50<br><br>Nominal value around 0.15 |
| $MNdd_{CL0}$ | Zero lift coefficient divergence Mach from which the compressibility effects are taken into account | Comprised between 0.40 and 0.70<br><br>Nominal value around 0.60 |
| kClMNdd | Correction coefficient on the divergence Mach making it dependent on the lift coefficient | Comprised between 0 and 1<br><br>Nominal value around 0 |
| k2compCd | 2-order coefficient for the compressibility effects correcting the drag coefficient | Comprised between 0 and 1<br><br>Nominal value around 1 |

FIG.16

| RESET COEFFICIENT OF THE MATHEMATICAL FORMULATION OF THE POLAR CHART | | |
|---|---|---|
| CL120 vs AoA122 | | |
| Coefficient | Description | Order of magnitude |
| V0qUtip120des | Value of the parameterV0qUtip120 at the drawing point of the propeller | Specific to each propeller but quite close to 1 (comprised between 0.90 and 1.20) |
| $k1Cl_{BASE}$ | Slope coefficient when the compressibility effect is zero | Comprised between 2 and 4<br><br>Nominal value between 2.5 and 3 |
| $AoACl0_{BASE}$ | Zero-lift angle of incidence when the compessibility effect and the 3D effects are zero | Comprised between -1deg and -4deg<br><br>Nominal value around -2.5deg |
| k1corrAoACl0 | 1-order coefficient for the 3D effects correcting the zero-lift angle of incidence | Comprised between -0.01 and 0.01<br><br>Nominal value around 0.005 |
| k2compAoACl0 | 2-order coefficient for the compressibility effects correcting the zero-lift angle of incidence | Comprised between -0.1 and 0.1<br><br>Nominal value around -0.05 |

FIG.17

| RESET COEFFICIENT OF THE MATHEMATICAL FORMULATION OF THE POLAR CHART | | |
|---|---|---|
| CD120 vs CL120 | | |
| Coefficient | Description | Order of magnitude |
| $VOqUtipQdesMax$ | Maximum value of VOqUtipQdes beyond which there is no longer any 3D effect | Comprised between 2 and 3<br><br>Nominal value around 2.5 |
| $CLml_{BASE}$ | Lift coefficient at the minimum drag coefficient when there is no 3D effect | Comprised between 0.1 and 0.4<br><br>Nominal value around 0.2 |
| $CDml_{BASE}$ | Minimum drag coefficient when there is no 3D effect | Comprised between 0.005 and 0.025<br><br>Nominal value around 0.01 |
| $kL_{BASE}$ | Slope coefficient on the sub-incidence side when there is no 3D effect | Comprised between 2 and 5<br><br>Nominal value around 3.5 |
| $kR_{BASE}$ | Slope coefficient on the over-incidence side when there is no 3D effect | Comprised between 0.01 and 0.5<br><br>Nominal value around 0.05 |
| $ExpL_{BASE}$ | Slope exponent on the sub-incidence side when there is no 3D effect | Comprised between 0.1 and 1<br><br>Nominal value around 0.2 |
| $ExpR_{BASE}$ | Slope exponent on the over-incidence side when there is no 3D effect | Comprised between 2 and 7<br><br>Nominal value around 5.5 |
| $k1corrCLml$ | 1-order coefficient for the 3D effects correcting the lift coefficient at the minimum drag coefficient | Comprised between -0.01 and 0.01<br><br>Nominal value around 0.005 |
| $k1corrCDml$ | 1-order coefficient for the 3D effects correcting the minimum drag coefficient | Comprised between -0.1 and 0.1<br><br>Nominal value around 0.015 |
| $k1corrKL$ | 1-order coefficient for the 3D effects correcting the slope coefficient on the sub-incidence side | Comprised between -0.2 and 0.2<br><br>Nominal value around -0.1 |
| $k1corrKR$ | 1-order coefficient for the 3D effects correcting the slope coefficient on the over-incidence side | Comprised between -0.05 and 0.05<br><br>Nominal value around 0.01 |
| $k1corrExpL$ | 1-order coefficient for the 3D effects correcting the slope exponent on the sub-incidence side | Comprised between -0.05 and 0.05<br><br>Nominal value around -0.01 |
| $k1corrExpR$ | 1-order coefficient for the 3D effects correcting the slope exponent on the over-incidence side | Comprised between -0.5 and 0.5<br><br>Nominal value around -0.15 |
| $MNdd_{CL0}$ | Zero lift coefficient divergence Mach from which the compessibility effects are taken into account | Comprised between 0.40 and 0.70<br><br>Nominal value around 0.60 |
| $kClMNdd$ | Correction coefficient on the divergence Mach making it dependent on the lift coefficient | Comprised between 0 and 1<br><br>Nominal value around 0.5 |
| $k2compCd$ | 2-order coefficient for the compressibility effects correcting the drag coefficient | Comprised between 0 and 1<br><br>Nominal value around 0.5 |

DEVICE FOR ASSISTING WITH REGULATION OF PROPELLERS OF AERONAUTICAL TURBOMACHINERY

TECHNICAL FIELD

The invention relates to the field of control devices for aeronautical turbomachines, which may be equipped with one single propeller or with a pair of propellers.

PRIOR ART

Engines with "unducted" fans (or "Open Rotor" in English) are a type of turbine engine wherein the fan is outside the casing, unlike conventional turbojet engines (of the "Turbofan" type in Anglo-Saxon terminology).

In particular, open rotor architectures include conventional turboprop engines with one single propeller, UDFs ("Unducted Dual Fan" also called "Contra-Rotating Open rotor" or CROR) as well as USFs (an acronym standing for the English term "Unducted Single Fan").

In the case of a CROR architecture, the propulsion system is composed of two rotors, namely a movable upstream propeller which drives the flow and a downstream propeller, counter-rotating relative to the upstream propeller, which is intended to straighten the flow.

In the case of a USF architecture, the upstream propeller is movable (i.e. rotor) while the downstream propeller is fixed (i.e. stator) and serves as a rectifier.

These different Open rotor architectures require a blade-pitch angle servo-control.

The regulation of the operation of the propeller or of the propellers is conventionally based on two main regulation modes.

First, a constant rotational speed regulation is known, wherein the pitch of the propeller, i.e. its blade-pitch angle, is adjusted using a servo-control loop allowing complying with a rotational speed setpoint, the actual speed being measured by a dedicated sensor. This regulation mode is used for all flight phases during which the speed of advance is high enough to obtain a stable aerodynamic operation of the propeller.

Constant blade-pitch angle regulation is also known, wherein the blade-pitch angle is servo-controlled with the joystick position given by the pilot and with the rotational speed of the propeller. This mode is used for all phases in which the speed of advance of the aircraft is too low for the aerodynamic characteristic of the propeller to have a sufficient traction response with regards to a variation in the rotational speed.

During a transition from one regulation mode to another, it is desired to minimise the thrust variations noticed for a given value of the power transmitted by the shaft, because such variations are detrimental to the perception of a proper behaviour of the motorisation by the pilot. It is also desired to limit variations in the speed of the propeller or of the propellers, because of the impact of these variations on the overall dynamics of the engine, the vibrations and the noise emitted. And it is also desired to preserve a continuity of the overall operation of the engine in all situations generating one transition between the operating modes, such as acceleration, deceleration, unexpected variations in the altitude of the aircraft, or failures.

The current architectures of regulation systems primarily rely on the measurement of the blade-pitch angles and of the rotational speeds of the propeller, and do not allow any preventive action.

One solution for obtaining a feedforward control of the blade-pitch angle requirements, for Open rotor architectures with one single propeller or a pair of contra-rotating propellers is disclosed in FR2 998 866, using iterative calculations of two-order polynomials whose coefficients are determined by interpolation of predefined tabular values.

This solution has drawbacks related to the interpolation and to the necessary iterations, in particular in terms of accuracy of calculation and reaction time with consequences on the convergence time of the blade-pitch angle servo-control. In addition, this solution does not take account of USF architectures.

DISCLOSURE OF THE INVENTION

To overcome the mentioned drawbacks, a control device for a propulsion system is proposed, comprising means for calculating a blade-pitch setpoint of at least one propeller of the propulsion system, the calculation means using a performance predictive model of the propeller taking account of at least one flight speed for adapting a blade-pitch angle setpoint.

This control device is characterised in that the performance predictive model of the propeller is configured to use polar charts implemented in the form of a mathematical law.

For example, the propulsion system comprises at least one element selected from among a rotor, a stator, an upstream rotor and a downstream rotor counter-rotating with respect to the upstream rotor, and a rotor and stator assembly, the rotor being located upstream of the stator.

Advantageously, the performance predictive model of the propeller takes account of a measurement of the rotational speed of the propeller and a measurement of the mechanical torque of the shaft of the propeller.

According to an advantageous feature, the performance predictive model of the propeller uses an optimisation mathematical law to define a blade-pitch setpoint for at least one stator.

For example, the calculation means comprise an iteration loop, a stop criterion of which is the convergence of a lift coefficient from a calculated value towards a value obtained by using the polar charts.

Advantageously, the calculation means comprise an iteration loop having a stop criterion determined based on a convergence from a calculated value of the mechanical torque towards the measured mechanical torque.

For example, the polar charts are obtained by using a reset of the mathematical formulation with regards to target results obtained by three-dimensional numerical simulation or by wind tunnel tests.

For example, said control device forms a module for a full-authority digital electronic controller.

The invention also relates to a full-authority digital electronic controller comprising a control device as mentioned.

The invention also relates to a turboprop engine comprising a control device as mentioned, as well as an aircraft equipped with such a turboprop engine.

According to another aspect, an object of the invention is a method for controlling a propulsion system, comprising a step of calculating a blade-pitch setpoint of at least one propeller of the propulsion system, during which a step of predicting the performance of the propeller is performed taking account of at least one flight speed to adapt a blade-pitch angle setpoint. This propeller performance prediction step is characterised by the use of the polar charts implemented in the form of a mathematical law.

BRIEF DESCRIPTION OF THE DRAWINGS

Other aims, features and advantages of the invention will become apparent upon reading the following description, given only as a non-limiting example, and made with reference to the appended drawings, wherein:

FIG. 1 illustrates the general principles of an embodiment of the invention;

FIG. 6 illustrates a flowchart of the architecture of the computation code associated with a rotor;

FIG. 7 illustrates the typical aspect of a polar chart relating the lift coefficient and the angle of incidence;

FIG. 14 illustrates the reset coefficients of the mathematical formulation of the polar chart Cl125 vs AoA127;

FIG. 15 illustrates the reset coefficients of the mathematical formulation of the polar chart Cd125 vs Cl125;

FIG. 16 illustrates the reset coefficients of the mathematical formulation of the polar chart Cl120 vs AoA122; and FIG. 17 illustrates the reset coefficients of the mathematical formulation of the polar chart Cd120 vs Cl120;

DETAILED DISCLOSURE OF AT LEAST ONE EMBODIMENT

Figure 1:
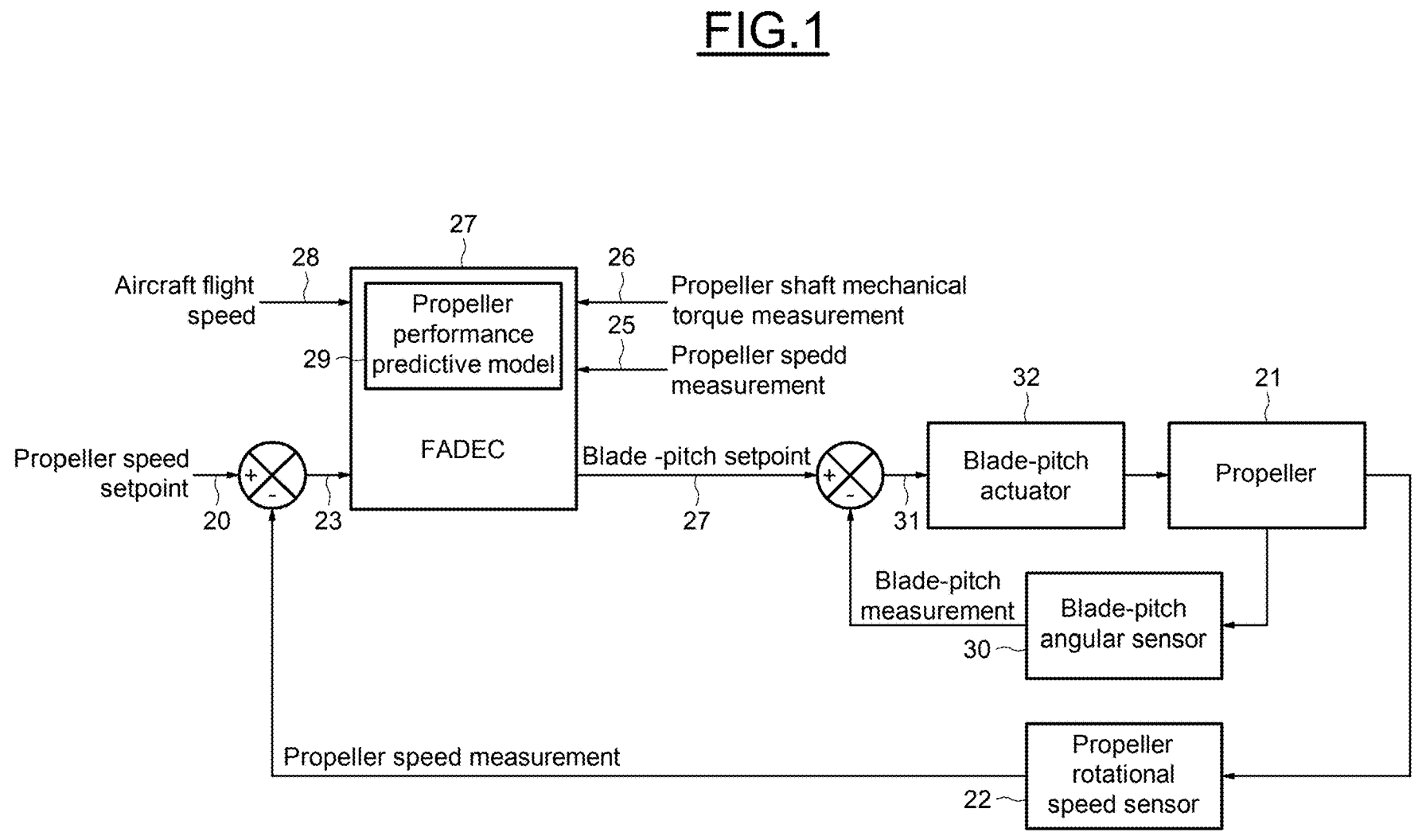
Figure 2:
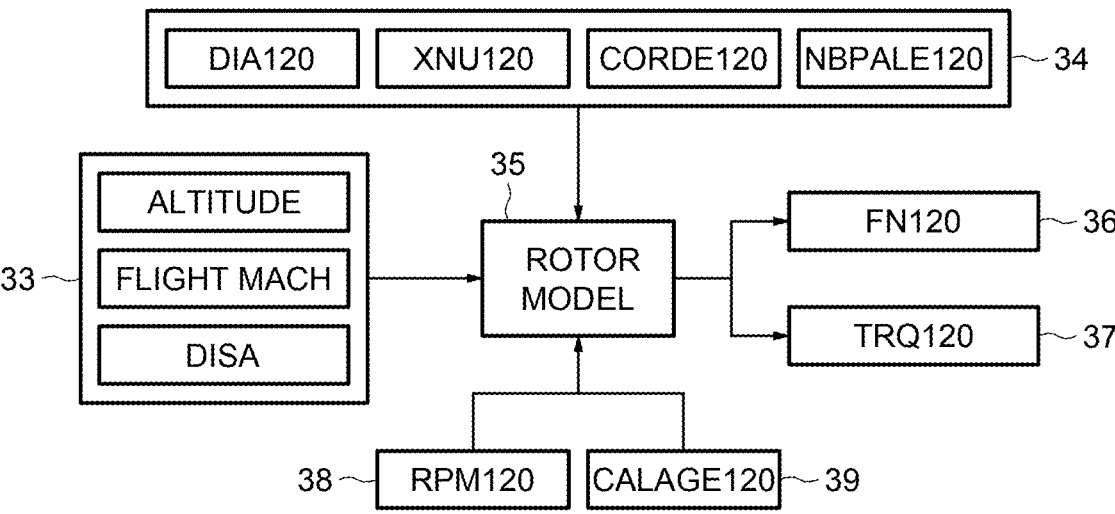
FIG. 2 illustrates a flowchart of the input and output data used in a computation code associated with a rotor.

FIG. 1 shows the general operation of an embodiment of the invention relating to a control loop of the blade-pitch angle of a propeller or of the propellers, for constant rotational speed regulation.

A setpoint 20 for the speed of the propeller 21 is given by the pilot or an automatic or servo-controlled piloting system. A propeller rotational speed sensor 22 allows calculating the difference 23 between the setpoint and the instantaneous speed.

This difference 23 is transmitted to the FADEC 24 (full-authority digital electronic controller) which calculates, using a measurement of the rotational speed 25 of the propeller and a measurement of the mechanical torque 26 of the propeller shaft, the power supplied to the propeller, as well as a blade-pitch setpoint 27. The FADEC 24 also takes account of a measurement of the flight speed of the aircraft 28. The FADEC 24 is configured and able to use for the calculation of the blade-pitch setpoint 27 a pre-programmed performance predictive model of the propeller 29 contained in its memory.

An angular blade-pitch angle sensor 30 allows calculating the difference 31 between the instantaneous blade-pitch angle value and the setpoint 27, which is transmitted to the actuator 32, consisting of a jack which acts on the blade-pitch angle of the propeller 21.

The performance predictive model of the propeller 29 is based on a lifting-line type one-dimension computation code, allowing estimating the aerodynamic performances of a rotor (applicable for a conventional propeller and for the CROR-type architecture) or of a stator (applicable in a USF-type configuration).

FIG. 2 shows a flowchart of the input and output data used in the computation code associated with a rotor. Thus, for given flight conditions 33 and for a given rotor geometry 34, it is possible to estimate, using a model 35 of the rotor, the thrust 36 delivered by the rotor, as well as the mechanical torque 37 consumed by the rotor for a given rotational speed 38 and for a given blade-pitch angle 39.

Figure 3:
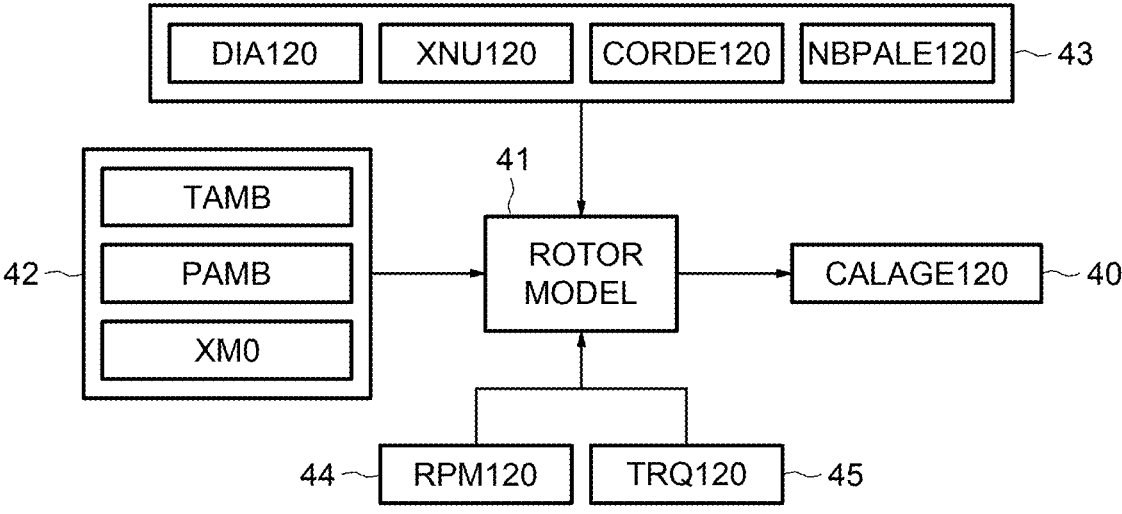
FIG. 3 illustrates a flowchart of the input and output data used to estimate the need for blade-pitch angle in a computation code associated with a rotor.

Based on the computation code shown in FIG. 2, it is possible to proceed in a reverse manner to estimate the blade-pitch angle requirement, as illustrated in FIG. 3. Thus, the blade-pitch angle requirement 40 may be estimated using the model 41 of the rotor from the parameters 42 representative of the flight conditions and measured by probes, from the known geometric parameters 43 of the rotor and from the measured parameters of the rotational speed 44 and the mechanical torque 45 of the rotor.

It should be noted that, to obtain the blade-pitch angles in the case of the pair of contra-rotating propellers as encountered in the CROR-type architectures, the computation code of FIG. 3 is applied to each upstream and downstream rotor.

In the case of a USF architecture, the computation code of FIG. 3 is used for the rotor and is supplemented by a computation code specific to the stator.

Figure 4:
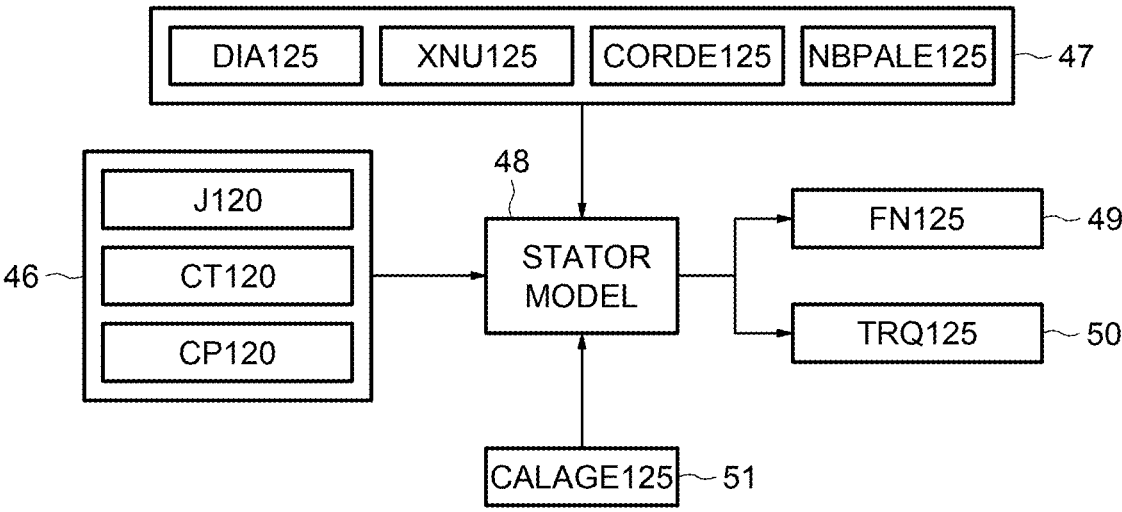
FIG. 4 illustrates a flowchart of the input and output data used in a computation code associated with a stator.

FIG. 4 shows a flowchart of the input and output data used in the computation code associated with a stator.

Thus, for given operating conditions 46 of the stator and for a given geometry 47 of the stator, it is possible to estimate, using a model 48 of the stator, the thrust 49 delivered by the stator, as well as the mechanical torque 50 generated by the stator for a given blade-pitch angle 51.

Figure 5:
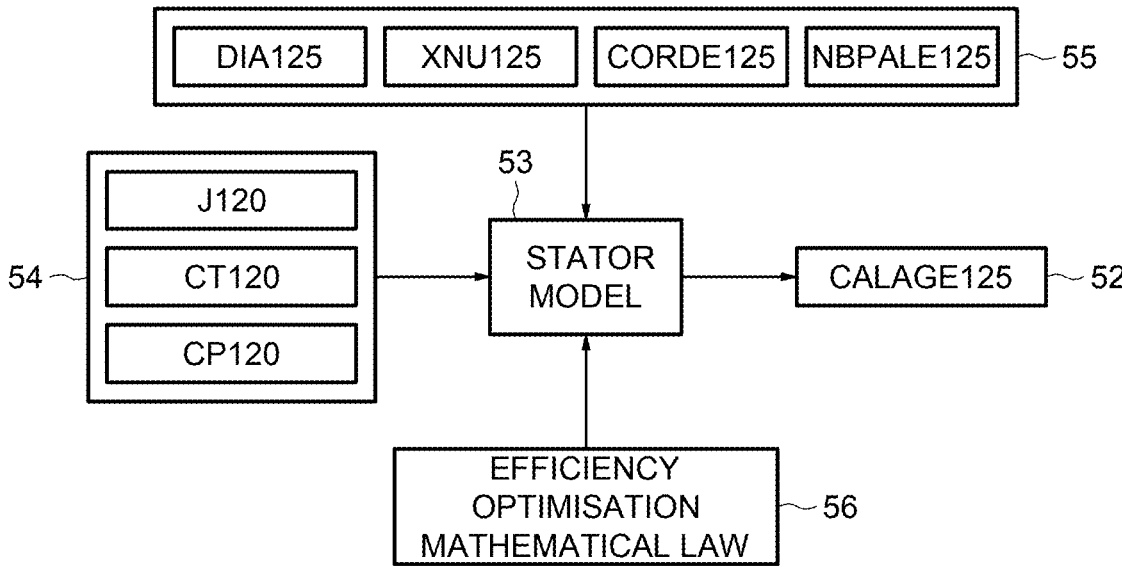
FIG. 5 illustrates a flowchart of the input and output data used to estimate the need for blade-pitch angle in a computation code associated with a stator.

Based on the computation code shown in FIG. 4, it is possible to proceed in a reverse manner to estimate the blade-pitch angle requirement, as illustrated in FIG. 5. Thus, the blade-pitch angle requirement 52 may be estimated using the model 53 of the stator from the operating conditions 54 of the stator, from the known geometric parameters 55 of the stator and from an optimisation mathematical law 56 which maximises the efficiency of the propeller module. The mathematical law 56 allows automatically adjusting the blade-pitch requirement of the stator in order to maximise the efficiency of the rotor and stator assembly for a given operating point of the propellers.

Figure 6:
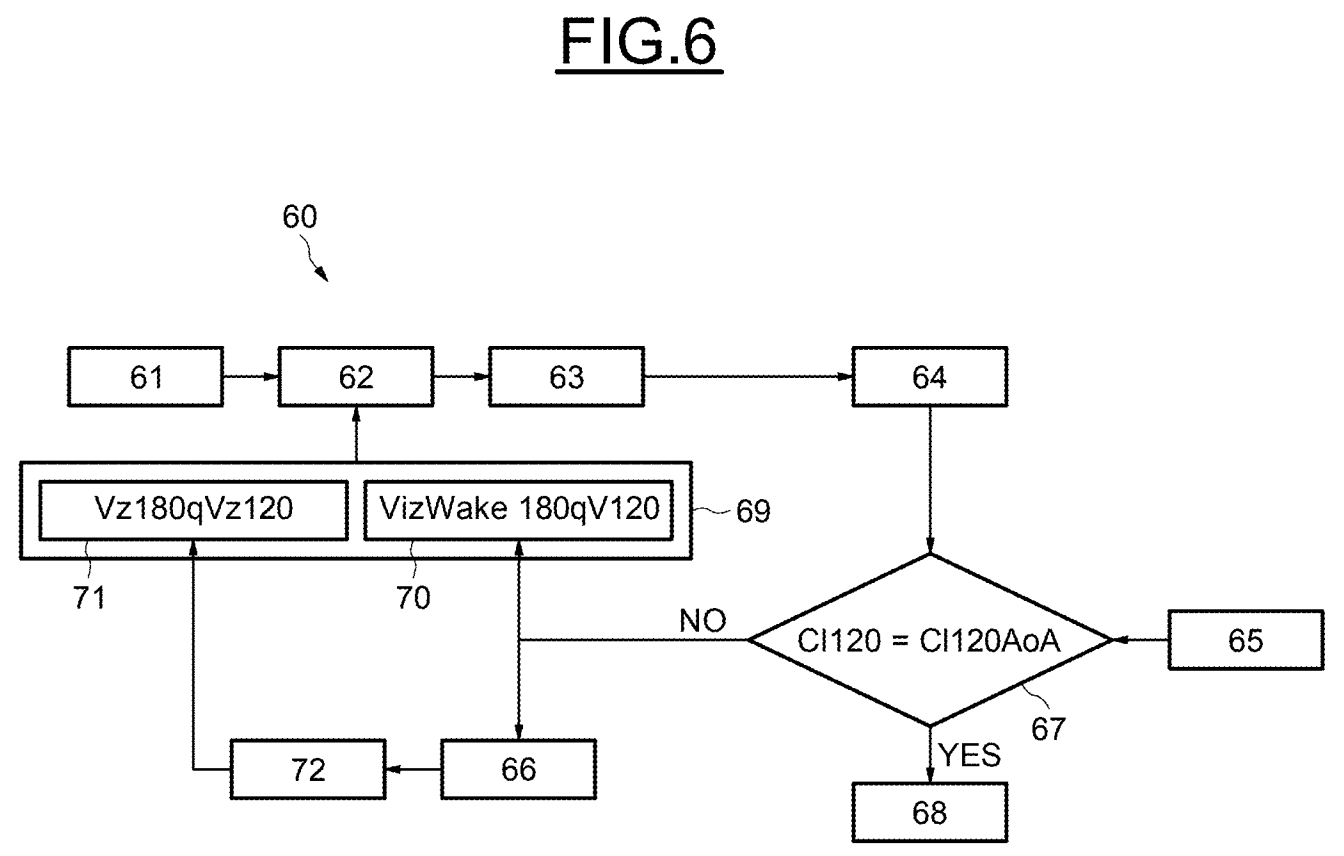

Next, the flowchart of FIG. 6 is described which summarises the architecture of the computation code associated with a rotor 60 and implemented by the FADEC 24 for any Open-rotor type propulsion configuration.

The input values 61 consist of geometric parameters known for a given rotor, atmospheric parameters measured by probes, mechanical parameters measured by sensors present on the engine and calculated parameters specified hereinafter.

For example, the geometry of a given rotor is characterised by geometric parameters such as the diameter, the hub ratio, the number of blades, the activity factor and a reference height at the plane of the rotor. From these initial geometric parameters, other geometric parameters are calculated such as the outer radius (Rtip), the inner radius (Rhub120), the passage section of the rotor (Area120), the mean chord of the rotor or the chord/diameter ratio of the rotor.

For example, the atmospheric parameters measured by probes and representative of a given flight condition are the flight speed (V0), the speed of sound (Vson) and the ambient density (RhoAmb).

For example, the mechanical parameters measured by sensors and representative of a given operating point are the rotational speed of the rotor (Nmech120), the blade-pitch angle of the rotor (Calage120) and the mechanical torque on the shaft of the rotor (Trq120). From these initial mechanical parameters, other parameters such as the peripheral speed of the rotor (Utip120) and the ratio between the flight speed and the peripheral speed of the rotor (V0qUtip120) are calculated.

After determination of the input data of step 61 by measurement or calculation, the FADEC 24 proceeds with step 62 of calculating the speed field of the wake at infinity downstream of the rotor while making the assumption of the conservation of the flow rate and using the transposition of the reference height at the plane of the rotor at infinity downstream (RqRtipWake180), the induced axial speed of the wake of the rotor at infinity (VizWake180), the contraction of the fluid stream between the plane of the rotor and infinity downstream (Rtip180qRtip120) and the ratio between the axial speed and the tangential speed at infinity downstream (VzWake180qUtip180) as specified in the following formulae.

$$RqRtipWake180 = \sqrt{\frac{RqRtipCalc0d120^2 - RhubQtip120^2}{1 - RhubQtip120^2}} \quad (1)$$

$$VizWake180 = VizWake180qV120* \quad (2)$$

$$\frac{\sqrt{V0^2 + (Utip120*RqRtipCalc0d120)^2}}{Rtip180qRtip120 = \sqrt{\frac{1 - RhubQtip120^2}{Vz180qVz120}}} \quad (3)$$

$$VzWake180qUtip180 = \frac{V0 + VizWake180}{Utip120*Rtip180qRtip120} \quad (4)$$

Wherein:

RqRtipWake180 is the transposition of the reference height at the plane of the rotor to infinity downstream;

RqRtipCalc0d120 represents the reference height at the plane of the rotor for the calculations of the model;

RhubQtip120 represents the hub ratio of the rotor;

VizWake180 is the induced axial speed of the wake of the rotor at infinity;

VizWake180qV120 is an iterative parameter representing the induced axial speed of the wake at the relative speed of the plane of the rotor;

V0 is the flight speed;

Utip120 is the peripheral speed of the rotor;

Rtip180qRtip120 represents the contraction of the fluid stream between the plane of the rotor and the infinity downstream; and Vz180qVz120 is an iterative parameter representing the ratio between the axial speed at infinity downstream and the axial speed at the plane of the rotor.

At this level, the FADEC 24 initialises the two iterative parameters VizWake180qV120 and Vz180qVz120, which will take on convergent values over the subsequent iterations (step 69).

Afterwards, the FADEC 24 performs step 63 of calculating the speed field at the plane of the rotor expressed by the following equations:

$$Viz122 = \frac{1}{2} * \frac{VizWake180}{1 + \left(\frac{VzWake180qUtip180}{RqRtipWake180}\right)^2} \quad (5)$$

$$Viu122 = \frac{1}{2} * \frac{VizWake180}{Utip120 * RqRtipCalc0d120} * \quad (6)$$

$$\frac{(V0 + VizWake180)}{1 + \left(\frac{VzWake180qUtip180}{RqRtipWake180}\right)^2}$$

$$V122 = \sqrt{(V0 + Viz122)^2 + (Utip120*RqRtipCalc0d120 - Viu122)^2} \quad (7)$$

$$Mn122 = \frac{V122}{Vson} \quad (8)$$

$$Phi122 = atan\left(\frac{V0 + Viz122}{Utip120 * RqRtipCalc0d120 - Viu122}\right) * \frac{180}{\pi} \quad (9)$$

$$AoA122 = Calage120 - Phi122 \quad (10)$$

Wherein,

Viz122 represents the induced axial speed at the plane of the rotor;

Viu122 represents the induced tangential speed of the relative reference frame at the plane of the rotor;

V122 represents the relative speed at the plane of the rotor;

Mn122 represents the associated Mach number; and

AoA122 is the angle of incidence.

Afterwards, the FADEC 24 performs the step 64 of calculating the aerodynamic coefficients by the following equations:

$$FuncPrandtl120 = \frac{2}{\pi} * acos\left(exp\left((-1) * \frac{1}{2} * NbPale120 * \right.\right. \quad (11)$$

$$\left.\left. (1 - RqRtipCalc0d120) * \frac{\sqrt{1 + VzWake180qUtip180^2}}{VzWake180qUtip180}\right)\right)$$

$$FuncGoldstein120 = FuncPrandtl120 * \quad (12)$$

$$\frac{RqRtipCalc0d120^2}{RqRtipCalc0d120^2 + VzWake180qUtip180^2}$$

$$Cl120 = \frac{2 * \pi}{NbPale120 * CqDiam120} * \quad (13)$$

$$\frac{VizWake180 * (V0 + VizWake180) * FuncGoldstein120}{V122 * Utip120}$$

Wherein,

FuncPrandtl120 represents the Prandtl approximation;

FuncGoldstein120 represents the Goldstein function; and

Cl120 is the lift coefficient of the blade of the rotor.

At this level, the FADEC 24 uses pre-programmed calculation functions contained in its memory, called polar charts, which connect in the form of mathematical laws the drag and lift coefficients determined experimentally or by 3D calculation for different angles of incidence. The methods used for the step 65 of calculating a polar chart expressing the lift coefficient (Cl120AoA) as a function of the angle of incidence (AoA122) and for step 66 of calculating a polar chart expressing the drag coefficient (Cd120) as a function of the lift coefficient (Cl120AoA) will be explained later on using FIGS. 7 to 10.

Afterwards, the FADEC performs a comparison (step 67) between the value of the lift coefficient derived from the analytical calculation (Cl120) and the value of the lift coefficient derived from the polar chart (Cl120AoA).

If the two compared values are equal, the convergence has been reached and the FADEC 24 uses the determined speed field at the plane of the rotor and the obtained aerodynamic coefficients, to calculate the thrust delivered by the rotor and the mechanical torque consumed by the rotor (step 68), with the following equations:

$$Fn120 = NbPale120 * \frac{1}{2} * RhoAmb * Corde120 * V122^2 * \big(Cl120 * \tag{14}$$
$$\cos\Big(Phi122 * \frac{\pi}{180}\Big) - Cd120 * \sin\Big(Phi122 * \frac{\pi}{180}\Big)\Big) * Rtip120 *$$
$$(1 - RhubQtip120)$$

$$Trq120 = NbPale120 * \frac{1}{2} * RhoAmb * Corde120 * V122^2 * \big(Cl120 * \tag{15}$$
$$\sin\Big(Phi122 * \frac{\pi}{180}\Big) + Cd120 * \cos\Big(Phi122 * \frac{\pi}{180}\Big)\Big) * Rtip120 *$$
$$(1 - RhubQtip120) * Rtip120 * RqRtipCalc0d120$$

Wherein,

Fn120 represents the thrust delivered by the rotor; and

Trq120 is the mechanical torque consumed by the rotor.

If the two compared values are not equal, the FADEC 24 proceeds with a new step 69 of iterating the calculation of iterative parameters VizWake180qV120 (step 70) and Vz180qVz120 (step 71).

For the calculation of the iterative parameter Vz180qVz120 (step 71), the FADEC 24 first performs a step 72 of evaluating the dimensionless invariants representative of the performances of a rotor as expressed in the following equations:

$$J120 = \frac{V0}{\Big(\frac{Nmech120}{60}\Big) * Diam120} \tag{16}$$

$$Ct120 = \frac{Fn120}{RhoAmb * \Big(\frac{Nmech120}{60}\Big)^2 * Diam120^4} \tag{17}$$

$$Cp120 = \frac{Trq120 * Nmech120 * \frac{\pi}{30}}{RhoAmb * \Big(\frac{Nmech120}{60}\Big)^3 * Diam120^5} \tag{18}$$

Wherein,

J120 is the advance coefficient of the rotor;

Ct120 is the traction coefficient of the rotor; and

Cp120 is the power coefficient of the rotor.

After step 72 of evaluating the dimensionless invariants, the FADEC 24 performs the calculation of the iterative parameter Vz180qVz120 (step 71) with the following equations:

$$Viz120qUtip120 = \frac{\sqrt{J120^2 + \frac{8 * Ct120}{\pi * (1 - RhubQtip120^2)}} - J120}{2 * \pi} \tag{19}$$

$$Viz120 = Viz120qUtip120 * Utip120 \tag{20}$$

$$Viz120 = V0 + Viz120 \tag{21}$$

$$Viz180 = V0 + 2 * Viz120 \tag{22}$$

$$Vz180qVz120 = \frac{Vz180}{Vz120} \tag{23}$$

Wherein,

Viz120qUtip120 represents the induced axial speed at the peripheral speed at the plane of the rotor;

Viz120 is the induced axial speed at the plane of the rotor;

Vz120 is the axial speed at the plane of the rotor; and

Vz180 is the axial speed at the wake at infinity downstream.

The computation code set out hereinabove is based on the direct path theory of a computation code associated with a rotor, as shown in FIG. 2, according to which the performances of the rotor (delivered thrust, consumed mechanical torque) as a function of piloting thereof (rotational speed and blade-pitch angle) are obtained.

Conversely, according to the principle shown in FIG. 3, the FADEC 24 uses the torque sensor available on the mechanical shaft of the rotor to determine the blade-pitch angle knowing the measured mechanical torque, using, for example, a servo-control loop which performs iterations on the blade-pitch angle to obtain the equality between the mechanical torque derived from the model and the measured mechanical torque.

Next, the mathematical formulation of the polar chart of a rotor as well as the method for obtaining it is set out.

The mathematical formulation of the polar chart depends on its shape. To identify this shape, it is necessary beforehand to obtain target results in terms of performances to be achieved. These target results are derived from the three-dimensional (3D) numerical simulations and/or physical wind tunnel tests for example.

Figure 7:
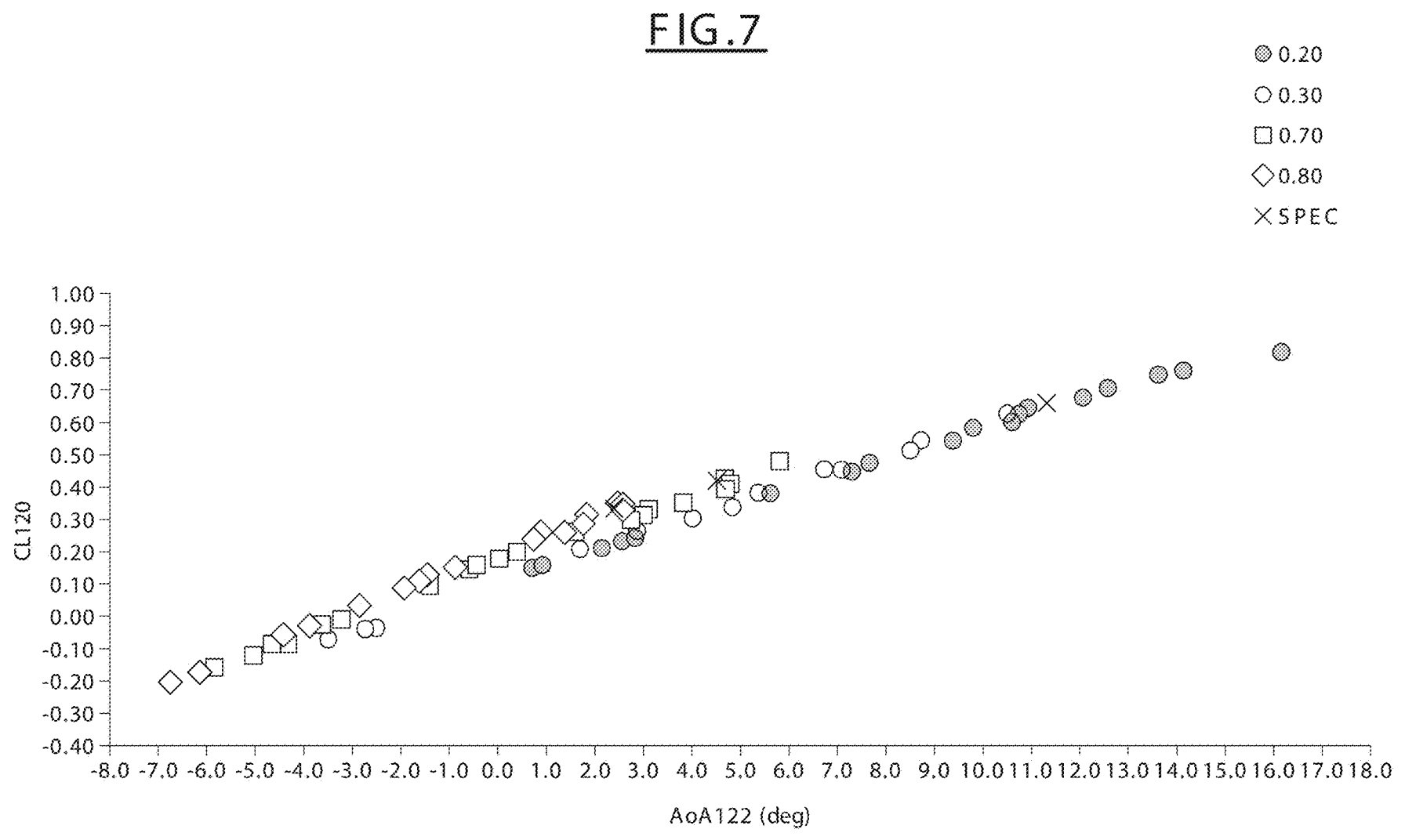

FIG. 7 shows the typical appearance of a polar chart relating the lift coefficient (Cl120) and the angle of incidence (AoA122).

Figure 8:
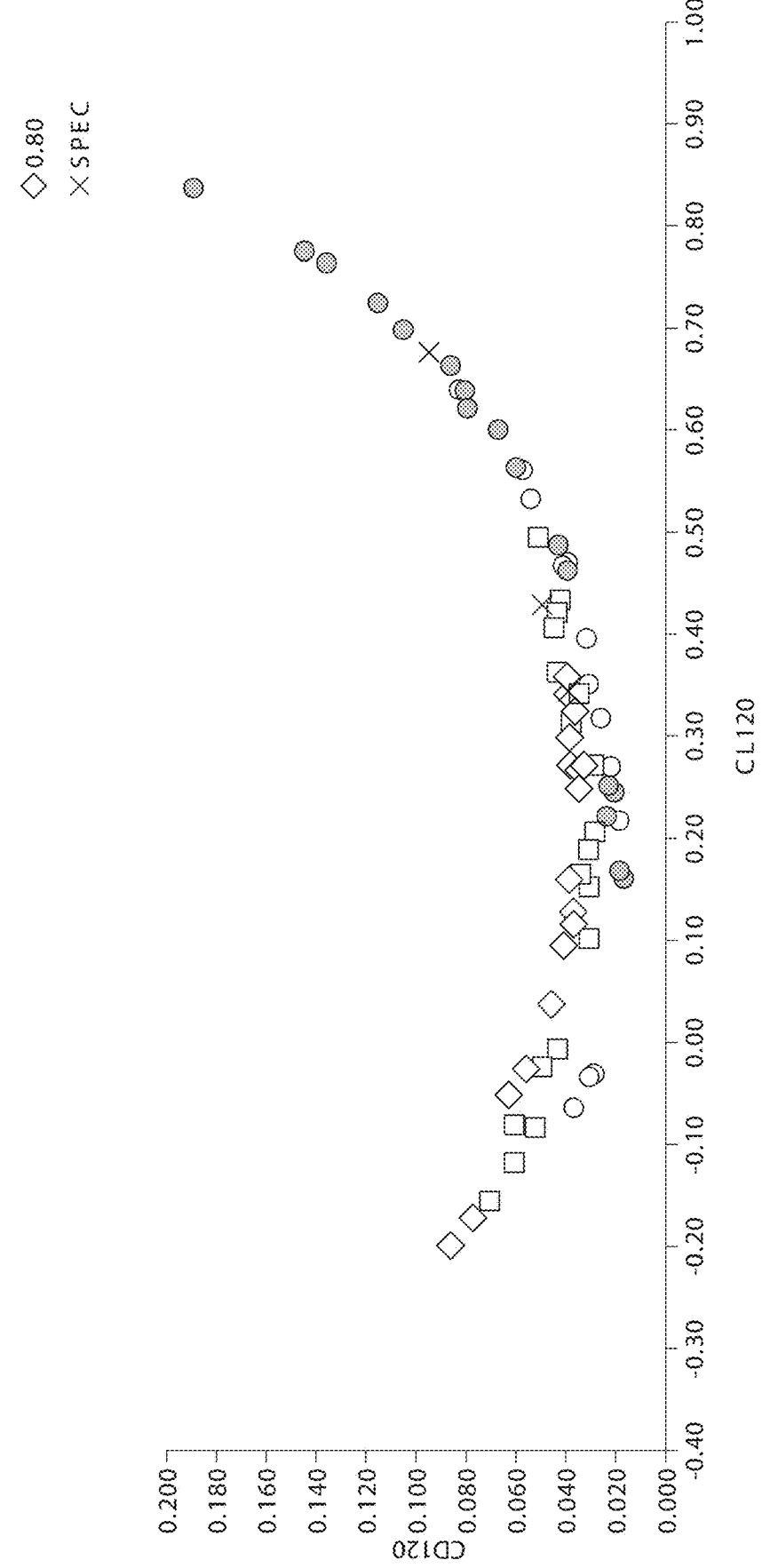
FIG. 8 illustrates the typical aspect of a polar chart relating the drag coefficient and the lift coefficient.

FIG. 8 shows the typical appearance of a polar chart relating the drag coefficient (Cd120) and the lift coefficient (Cl120).

The points represented in the graphs of FIGS. 7 and 8 have been obtained by 3D numerical simulation calculations of a propeller with a known geometry. These calculations have been controlled as a function of the Mach number, the rotational speed and the blade-pitch angle originating from the target results. The lift coefficient (Cl120) and the drag coefficient (Cd120) have been identified to find the values of traction coefficient (Ct120) and power coefficient (Cp120) originating from the target results.

The mathematical formulation of the polar charts proposes to establish a mathematical model that minimises deviations from all points. To build this mathematical model, some dependency parameters are selected.

The polar chart (Cl120 vs AoA122) giving the lift coefficient as a function of the angle of incidence depends on the following parameters: the angle of incidence, the relative Mach number (Mn122) to take account of the compressibility effects, and the ratio between the flight speed and the peripheral speed of the propeller (V0qUtip120) to take account of the 3D effects of the variation of the distribution of the load over the height of the blading.

The polar chart (Cd120 vs Cl120) giving the drag coefficient as a function of the lift coefficient depends on the following parameters: the lift coefficient, the relative Mach number (Mn122) to take account of the compressibility effects, and the ratio between the flight speed and the peripheral speed of the propeller (V0qUtip120) to take account of the 3D effects of the variation of the distribution of the load over the height of the blading.

The ratio (V0qUtipQdes) between the parameter V0qUtip120 and the value of this parameter at the drawing point of the propeller (V0qUtip120des) is defined by the following equation:

$$V0qUtipQdes = \frac{V0qUtip120}{V0qUtip120des} \qquad (24)$$

This ratio allows modelling the 3D effects of the variation of the distribution of the load over the height of the blading.

Afterwards, the slope coefficient k1Cl of the polar chart (Cl120 vs AoA122) is defined by the following equation:

$$k1Cl = \frac{k1Cl_{BASE}}{\sqrt{1 - k2compKCl * Mn122^2}} \qquad (25)$$

Wherein, $k1Cl_{BASE}$ represents the slope coefficient when the compressibility effect is zero; and $k2compKCl$ is a corrective coefficient.

Afterwards, the angle of incidence is defined when the lift coefficient is zero, depending on the compressibility effects and the 3D load distribution effects, by the following equation:

$$AoACl0 = AoACl0_{BASE} + \qquad (26)$$
$$\left(k1corrAoACl0 * V0qUtipQdes + k2compAoACl0 * Mn122^2\right) * \frac{180}{\pi}$$

Wherein, $AoACl0_{BASE}$ represents the angle of incidence with zero lift when the compressibility effect and the 3D effects are zero;

$k1corrAoACl0$ is a 1-order coefficient which takes account of the 3D effects and corrects the angle of incidence with zero lift; and $k2compAoACl0$ is a 2-order coefficient which takes account of the compressibility effects and corrects the angle of incidence with zero lift.

The mathematical formulation of the polar chart (Cl120 vs AoA122) giving the lift coefficient as a function of the angle of incidence is defined by the following equation:

$$Cl120 = k1Cl * \sin\left((AoA122 - AoACl0) * \frac{180}{\pi}\right) \qquad (27)$$

The equation (27) is used by the FADEC 24 during step 65 of calculating the polar chart expressing the lift coefficient (Cl120AoA) as a function of the angle of incidence (AoA122).

Figure 9:
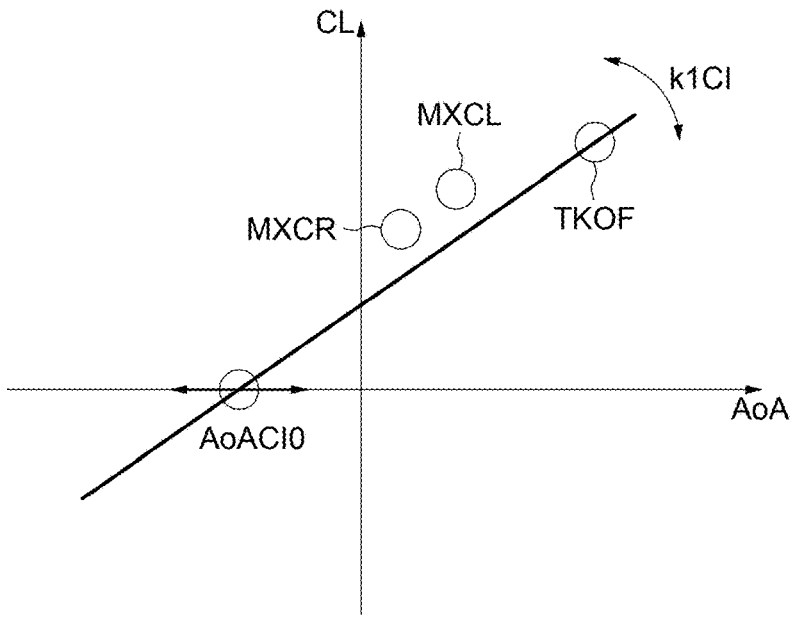
FIG. 9 qualitatively illustrates the influence of the reset parameters in the determination of a polar chart associated with a rotor.

FIG. 9 qualitatively illustrates the influence of the parameters k1Cl and AoACl0 in the determination of a curve whose plot should minimise deviations from the given points MXCR, MXCL and TKOF. The parameter AoACl0 represents the point of intersection of this curve with the axis AoA corresponding to zero lift and the parameter k1Cl defines the slope of this curve.

For the mathematical formulation of the polar chart (Cd120 vs Cl120) giving the drag coefficient as a function of the lift coefficient, the upper limit of the 3D effects of load distribution over the height of the propeller is first defined, because it has been noticed that the 3D effect becomes negligible for high values of V0qUtipQdes. This limit is given by the following equation:

$$V0qUtipQdesCorr = \min(V0qUtipQdes, V0qUtipQdesMax) \qquad (28)$$

Wherein,

V0qUtipQdesMax represents the maximum value of V0qUtipQdes beyond which the 3D effects become negligible.

For the mathematical definition of the polar chart (Cd120 vs Cl120), support is made on a hyperbolic cosine bi-parabolic type curve as expressed by the following equations:

$$DeltaClLow = \text{abs}(\min(Cl120 - CLml, 0)) \qquad (29)$$

$$DeltaClHigh = \max(0, Cl120 - CLml) \qquad (30)$$

$$Cd120 = CDml + kL = \qquad (31)$$
$$\left(\cosh(DeltaClLow)^{ExpL} - 1\right) + kR * \left(\cosh(DeltaClHigh)^{ExpR} - 1\right)$$

Figure 10:
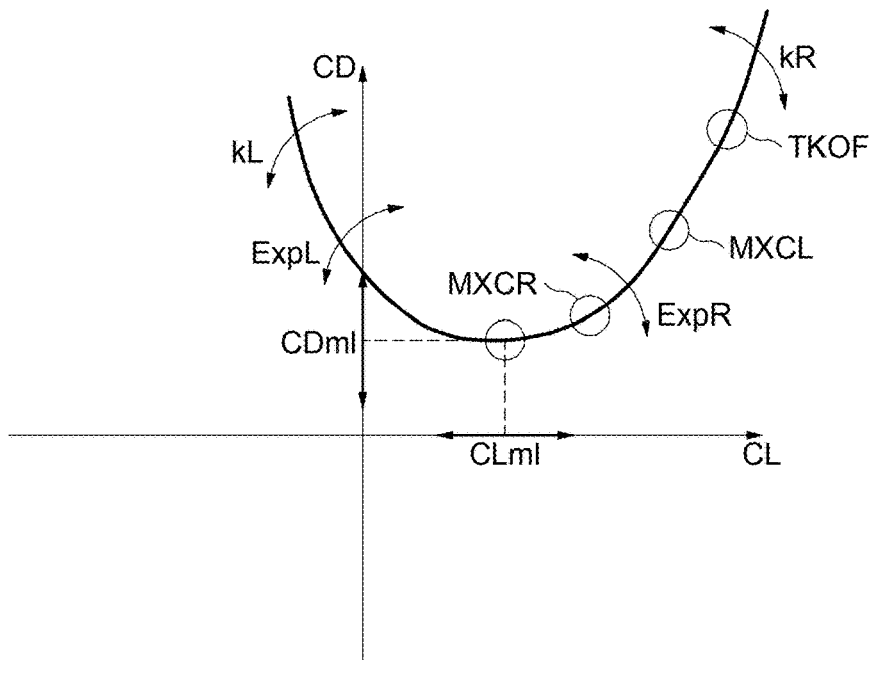
FIG. 10 qualitatively illustrates the influence of the reset parameters in the determination of a polar chart associated with a rotor or a stator.
Figure 11:
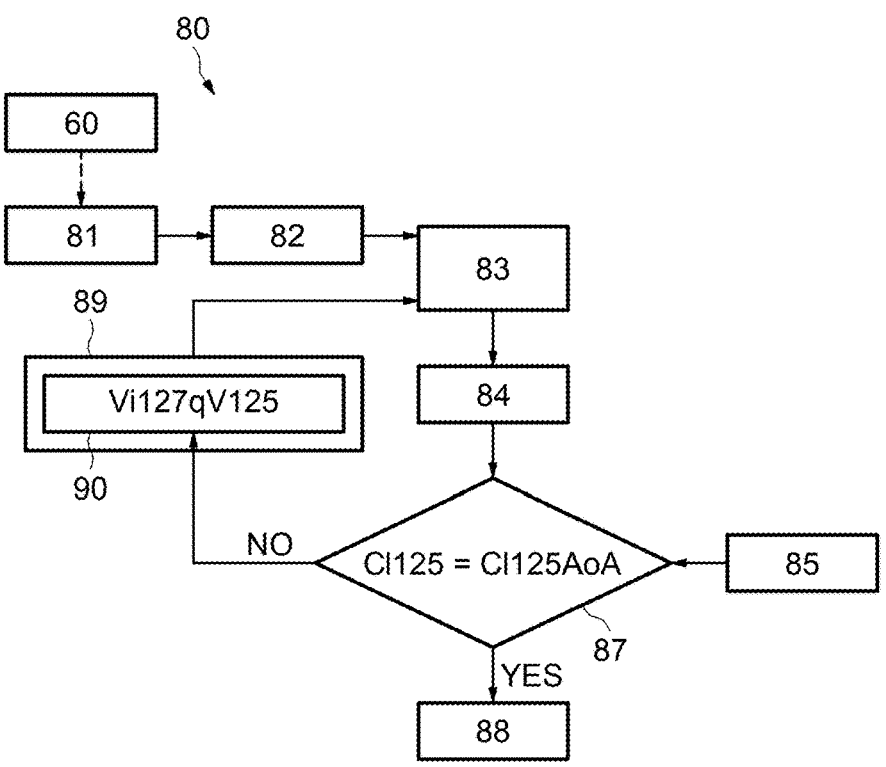
FIG. 11 illustrates a flowchart of the architecture of the computation code associated with a stator.

FIG. 10 qualitatively illustrates the influence of the reset parameters kL, ExpL, CDml, CLml, ExpR and kR on the curve whose plot should minimise deviations from the given points MXCR, MXCL and TKOF. The parameters CLml and CDml define the position of the point corresponding to the minimum drag coefficient. The parameters kL and ExpL define the slope of the curve on the sub-incidence side. The parameters kR and ExpR define the slope of the curve on the over-incidence side.

Afterwards, corrections are defined on the different coefficients, in order to take account of the 3D effects of the distribution of the load over the height of the propeller, by the following equations:

$$CLml = CLml_{BASE} + k1corrCLml * V0qUtipQdesCorr \qquad (32)$$

$$CDml = CDml_{BASE} + k1corrCDml * V0qUtipQdesCorr \qquad (33)$$

$$kL = kL_{BASE} + k1corrKL * V0qUtipQdesCorr \qquad (34)$$

$$kR = kR_{BASE} + k1corrKR * V0qUtipQdesCorr \qquad (35)$$

$$ExpL = ExpL_{BASE} + k1corrExpL * V0qUtipQdesCorr \qquad (36)$$

$$ExpR = ExpR_{BASE} + k1corrExpR * V0qUtipQdesCorr \qquad (37)$$

Wherein, $CLml_{BASE}$ is the lift coefficient corresponding to the minimum drag coefficient when the 3D effect becomes negligible;

$CDml_{BASE}$ is the minimum drag coefficient when the 3D effect becomes negligible;

$kL_{BASE}$ is the slope coefficient on the sub-incidence side when the 3D effect becomes negligible;

$kR_{BASE}$ is the slope coefficient on the over-incidence side when the 3D effect becomes negligible;

$ExpL_{BASE}$ is the slope exponent on the sub-incidence side when the 3D effect becomes negligible;

$ExpR_{BASE}$ is the slope exponent on the over-incidence side when the 3D effect becomes negligible;

k1corrCLml is the 1-order coefficient which takes account of the 3D effects and corrects the lift coefficient corresponding to the minimum drag coefficient;

k1corrCDml is the 1-order coefficient which takes account of the 3D effects and corrects the minimum drag coefficient;

k1corrKL is the 1-order coefficient which takes account of the 3D effects and corrects the slope coefficient on the sub-incidence side;

k1corrKR is the 1-order coefficient which takes account of the 3D effects and corrects the slope coefficient on the over-incidence side;

k1corrExpL is the 1-order coefficient which takes account of the 3D effects and corrects the slope exponent on the sub-incidence side; and k1corrExpR is the 1-order coefficient which takes account of the 3D effects and corrects the slope exponent on the over-incidence side.

Finally, the correction to be made to model the compressibility effect is defined by the following equations:

$$MNdd = MNdd_{CL0} + kClMNdd * Cl120 \qquad (38)$$

$$DeltaMNdd = \max(0, Mn122 - MNdd) \qquad (39)$$

$$AdderCdComp = k2compCd * DeltaMNdd^2 \qquad (40)$$

Wherein,

MNddCL0 is the divergence Mach number corresponding to the zero lift coefficient from which the compressibility effects are taken into account;

kClMNdd is the correction coefficient of the divergence Mach number as a function of the lift coefficient;

k2compCd is the 2-order coefficient which takes account of the compressibility effects and corrects the drag coefficient.

The mathematical formulation of the polar chart (Cd120 vs Cl120) giving the drag coefficient as a function of the lift coefficient is defined by the following equation:

$$Cd120 = CDml + kL * \left(\cosh(DeltaClLow)^{ExpL} - 1\right) + \qquad (41)$$
$$kR * \left(\cosh(DeltaClHigh)^{ExpR} - 1\right) + AdderCdComp$$

The equation (41) is used by the FADEC 24 during step 66 of calculating the polar chart expressing the drag coefficient (Cd120) as a function of the lift coefficient derived from the polar chart (Cl120AoA).

The reset coefficients of the mathematical formulation of the polar chart Cl120 vs AoA122 and of the polar chart Cd120 vs Cl120 are specified in the tables of FIGS. 16 and 17, respectively.

Next, the flowchart of FIG. 1 which summarises the architecture of the computation code associated with a stator 80 and implemented by the FADEC 24 is described in the context of a USF-type propulsion architecture.

The input values 81 consist of geometric parameters known for a given stator, atmospheric parameters measured by probes, a mechanical parameter measured by sensors present on the engine and calculated parameters specified hereinafter.

For example, the geometry of a given stator is characterised by geometric parameters such as the diameter, the hub ratio, the number of blades, the activity factor and a reference height at the propeller plane. From these initial geometric parameters, other geometric parameters such as the outer radius (Rtip125), the inner radius (Rhub125), the passage section of the stator (Area125), the mean chord of the stator or the elongation of the stator are calculated.

For example, the atmospheric parameters measured by probes and representative of a given flight condition are the flight speed (V0), the speed of sound (Vson) and the ambient density (RhoAmb).

For example, the mechanical parameter measured by sensors and representative of a given operating point is the blade-pitch angle of the stator (Calage125).

The FADEC 24 uses the computation code associated with the upstream rotor 60 to supplement the input parameters (step 81) with the hub ratio of the rotor (RhubQtip120), the reference height at the plane of the rotor for the calculations of the model (RqRtipCalc0d120), the axial speed induced at the plane of the rotor (Viz120), the axial speed at the plane of the rotor (Vz120) and the tangential speed at the immediate downstream of the rotor (Vu124). the speed Vu124 is calculated using the following equations:

$$Whel120 = RhoAmb * Vz120 * Area120 \qquad (42)$$

$$dHt120 = \frac{Trq120 * Nmech120 * \frac{\pi}{30}}{Whel120} \qquad (43)$$

$$Vu124 = \frac{dHt120}{Utip120 * RqRtipCalc0d120} \qquad (44)$$

Wherein,

Whel120 represents the flow rate passing through the plane of the rotor; and dHt120 represents the increase in enthalpy throughout the disc of the rotor.

Afterwards, the FADEC 24 performs a step 82 of calculating the speed field at the upstream of the stator. To transpose the magnitudes of the speed field at the immediate downstream of the rotor to the upstream of the stator, the FADEC 24 uses a coefficient (CoeffVz125) adjusting the induced axial speed of the current tube of the rotor at the upstream of the stator by the following equation:

$$Viz125 = (1 + CoeffVz125) * Viz120 \qquad (45)$$

According to the equation (42), if CoeffVz125 is zero, then the induced axial speed at the upstream of the rectifier (Viz125) is equal to the induced axial speed at the immediate downstream of the rotor and it is considered that the rectifier is located very close to the propeller.

According to the equation (42), if CoeffVz125 is equal to 1, then the induced axial speed at the upstream of the rectifier (Viz125) is equal to twice the induced axial speed at the immediate downstream of the rotor, and it is considered that the stator is located in the downstream infinite wake of the rotor.

To calculate the speed field at the upstream of the stator, the FADEC 24 uses the following equations:

$$Vz125 = V0 + Viz125 \tag{46}$$

$$Vz125qVz120 = \frac{Vz125}{Vz120} \tag{47}$$

$$Rtip125qRtip120Aero = \sqrt{\frac{1 - RhubQtip120^2}{\left(1 - RhubQtip125^2\right) * Vz125qVz120}} \tag{48}$$

$$RqRtip125 = \tag{49}$$

$$\sqrt{\frac{RqRtipCalc0d120^2 - RhubQtip120^2}{Vz125qVz120 * Rtip125qRtip120Aero^2} + RhubQtip125^2}$$

$$Vu125 = \frac{Vu124 * RqRtipCalc0d120}{RqRtip125 * Rtip125qRtip120Aero} \tag{50}$$

$$V125 = \sqrt{Vz125^2 + Vu125^2} \tag{51}$$

Wherein,

Vz125 is the axial speed at the upstream of the stator;

Vz125qVz120 represents the ratio between the axial speed at the upstream of the stator and the speed at the plane of the rotor;

Rtip125qRtip120Aero represents the ratio of the outer aerodynamic radius between the plane of the stator and the plane of the rotor;

RqRtip125 represents the projection of the reference height of the plane of the propeller at the upstream plane of the stator;

Vu125 is the tangential speed at the upstream of the stator; and

V125 is the absolute speed at the upstream of the stator;

The FADEC 24 calculates the blade-pitch angle of the absolute speed (Phi125) with the following equations:

$$Phi125 = \operatorname{atan}\left(\frac{Vz125}{Vu125}\right) * \frac{180}{\pi}, \text{ pour } \operatorname{atan}\left(\frac{Vz125}{Vu125}\right) * \frac{180}{\pi} > 0 \tag{52}$$

$$Phi125 = \operatorname{atan}\left(\frac{Vz125}{Vu125}\right) * \frac{180}{\pi} + 180, \text{ pour } \operatorname{atan}\left(\frac{Vz125}{Vu125}\right) * \frac{180}{\pi} \le 0 \tag{53}$$

It may be considered that the stator generates an induced speed perpendicular to the absolute speed upstream of the stator and in the direction opposite to the thrust generated by the stator. Taking account of this induced speed (Vi127) then allows determining the absolute speed involved in the calculation of the definition of the generated thrust and of the resistive torque of the stator.

Afterwards, the FADEC 24 performs a step 83 of calculating the speed field at the plane of the stator, corrected for the induced effects.

The axial (Viz127) and tangential (Viu127) induced speeds at the calculation plane of the stator are expressed by the following equations:

$$Viz127 = V125 * Vi127qV125 * \cos\left(Phi125 * \frac{\pi}{180}\right) \tag{54}$$

$$Viu127 = V125 * Vi127qV125 * \sin\left(Phi125 * \frac{\pi}{180}\right) \tag{55}$$

The equations 54 and 55 contain the iterative parameter that expresses the ratio between the speed induced at the plane of the stator and the absolute speed upstream of the stator. At this level, the FADEC 24 initialises the iterative parameter Vi127qV125, which will take on convergent values throughout the subsequent iterations (step 89).

The FADEC 24 calculates the speed field at the plane of the stator corrected for the induced effects, by the following equations:

$$Vz127 = Vz125 + Viz127 \tag{56}$$

$$Vu127 = Vu125 - Viu127 \tag{57}$$

$$V127 = \sqrt{Vz127^2 + Vu127^2} \tag{58}$$

$$Mn127 = \frac{V127}{Vsom} \tag{59}$$

Wherein,

Vz127 is the axial speed at the stator, corrected for the induced effects;

Vu127 is the tangential speed at the stator, corrected for the induced effects;

V127 is the absolute speed at the stator, corrected for the induced effects; and Mn127 is the Mach number associated with the absolute speed.

The FADEC 24 calculates the blade-pitch angle at the absolute speed (Phi127) and the angle of incidence (AoA127) with the following equations:

$$Phi127 = \operatorname{atan}\left(\frac{Vz127}{Vu127}\right) * \frac{180}{\pi}, \text{ pour } \operatorname{atan}\left(\frac{Vz127}{Vu127}\right) * \frac{180}{\pi} > 0 \tag{60}$$

$$Phi127 = \operatorname{atan}\left(\frac{Vz127}{Vu127}\right) * \frac{180}{\pi} + 180, \text{ pour } \operatorname{atan}\left(\frac{Vz127}{Vu127}\right) * \frac{180}{\pi} \le 0 \tag{61}$$

$$AoA127 = Calage125 - Phi127 \tag{62}$$

Afterwards, the FADEC 24 performs the calculation 84 of the aerodynamic coefficient by the following equation:

$$Cl125 = \frac{Vi127qV125 * \pi * AspRatio125}{CoeffKJ125} \tag{63}$$

The equation (63) contains a reset coefficient CoeffKJ125 which allows adapting the Kutta-Joukowski theorem to stator-type geometries located downstream of a rotor.

At this level, the FADEC 24 uses pre-programmed calculation functions contained in its memory, called polar charts, which relate, in the form of mathematical laws, the drag and lift coefficients determined experimentally or by 3D calculation for different angles of incidence. The methods used in the case of a stator for calculating a polar chart expressing the lift coefficient (Cl125AoA) as a function of the angle of incidence (AoA127) (step 85) and for calculating a polar chart expressing the drag coefficient (Cd125) as a function of the lift coefficient (Cl125AoA) (step 86) will be explained later on.

Afterwards, the FADEC 24 performs a step 87 of comparison between the value of the lift coefficient derived from the analytical calculation (Cl125) and the value of the lift coefficient derived from the polar chart (Cl125AoA).

If the two compared values are equal, the convergence has been reached and the FADEC 24 uses the determined speed field at the plane of the stator and the obtained aerodynamic coefficients, to perform the calculation of the thrust delivered by the propeller and the mechanical torque consumed by the propeller (step 88), with the following equations:

$$Fn125 = NbPale125 * \frac{1}{2} * RhoAmb * Corde125 * V127^2 * \qquad (64)$$
$$\left( Cl125 * \cos\!\left( Phi127 * \frac{\pi}{180} \right) - Cd125 * \sin\!\left( Phi127 * \frac{\pi}{180} \right) \right) *$$
$$Rtip125 * (1 - RhubQtip125)$$

$$Trq125 = NbPale125 * \frac{1}{2} * RhoAmb * Corde125 * V127^2 * \qquad (65)$$
$$\left( Cl125 * \sin\!\left( Phi127 * \frac{\pi}{180} \right) - Cd125 * \cos\!\left( Phi127 * \frac{\pi}{180} \right) \right) *$$
$$Rtip125 * (1 - RhubQtip125) * Rtip125 * RqRtipCalc0d125$$

If the two compared values are not equal, the FADEC 24 proceeds with a new iteration (step 89) of the calculation of the iterative parameter Vi127qV125 (step 90).

The FADEC 24 performs the evaluation of the dimensionless invariants representative of the performances of the stator by the following equations:

$$J125 = \pi * \frac{Vz127}{Vu127} \qquad (66)$$

$$Ct125 = \frac{Fn125}{RhoAmb * V125^2 * Diam125^2} \qquad (67)$$

$$Cq125 = \frac{Trq125}{RhoAmb * V125^2 * Diam125^3} \qquad (68)$$

Wherein,

J125 is the advance coefficient of the stator;

Ct125 is the traction coefficient of the stator; and

Cp125 is the power coefficient of the stator.

It is necessary to associate a piloting objective with the computation code 80 in order to be able to use it to predict the variations in the blade-pitch angle of the associated stator. For the rotor, the measurement of the mechanical torque forms the piloting objective, but in the case of the stator it is necessary to find an alternative solution because this measurement type is not available.

The blade-pitch of the stator is determined so as to maximise the thrust generated by this stator in order to maximise the efficiency of the rotor/stator module thereby allowing minimising the fuel consumption.

Figure 12:
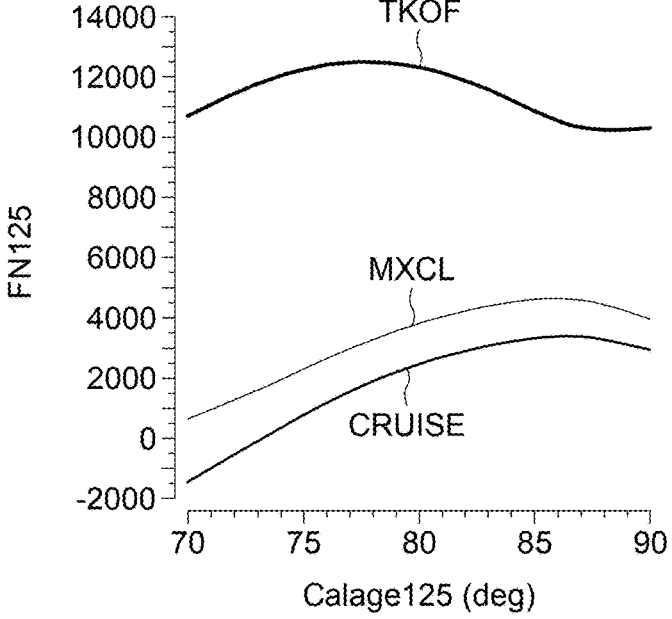
FIG. 12 illustrates the variation of the thrust delivered by a stator as a function of the blade-pitch angle of the stator for three different types of operation.
Figure 13:
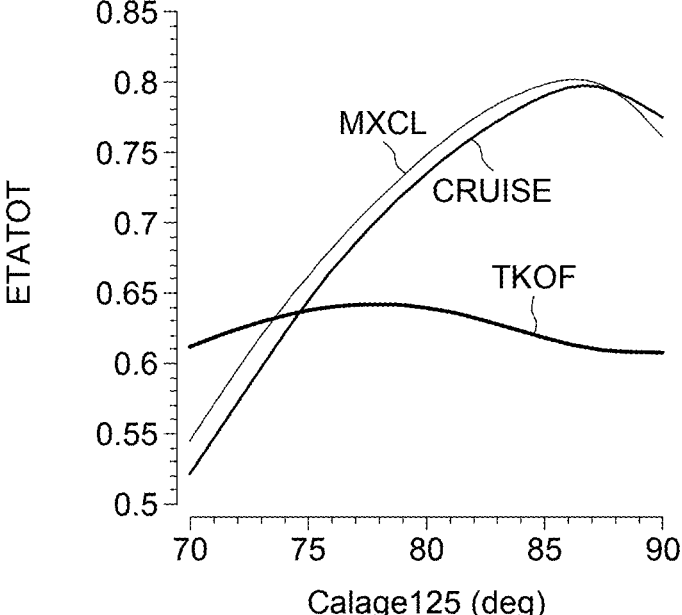
FIG. 13 illustrates the variation of the efficiency of the rotor/stator module as a function of the blade-pitch angle of the stator for three different types of operation.

FIGS. 12 and 13 show graphs showing that the maximisation of the rotor/stator overall efficiency is reached when the thrust on the stator is maximum.

FIG. 12 illustrates the variation of the thrust delivered (Fn125) by the stator as a function of the blade-pitch angle of the stator (Calage 125) for three different types of operation, namely hovering (CRUISE), climb point (MXCL) and take-off (TKOF).

FIG. 13 illustrates the variation of the efficiency of the rotor/stator module (Etatot) as a function of the blade-pitch angle of the stator (Calage 125) for three different types of operation, namely hovering (CRUISE), climb point (MXCL) and take-off (TKOF).

One could notice that the blade-pitch of the stator maximising the thrust of the stator is the same as that one which also maximises the overall efficiency.

Henceforth, it is proposed to define an analytical control equation which adjusts the blade-pitch of the stator automatically in order to maximise the thrust of this stator.

To this end, the FADEC 24 first calculates a series of derivatives by the following equations:

$$dCl125QdVi127qV125 = \frac{\pi * AspRatio125}{CoeffKJ125} \qquad (69)$$

The equation (69) expresses the derivative (dCl125QdVi127qV125) of the lift coefficient of Kutta-Joukowsky theorem;

$$dVz127QdVi127qV125 = V125 * \cos\!\left( Phi125 * \frac{\pi}{180} \right) \qquad (70)$$

The equation (70) gives the expression of the derivative (dVz127QdVi127qV125) of the axial component of the absolute speed of the stator;

$$dVu127QdVi127qV125 = (-1) * V125 * \sin\!\left( Phi125 * \frac{\pi}{180} \right) \qquad (71)$$

The equation (71) expresses the derivative (dVu127QdVi127qV125) of the tangential component of the absolute speed of the stator;

$$dV125QdVi127qV125 = dVz127QdVi127qV125 * \sin\!\left( Phi127 * \frac{\pi}{180} \right) + \qquad (72)$$
$$dVu127QdVi127qV125 * \cos\!\left( Phi127 * \frac{\pi}{180} \right)$$

The equation (72) expresses the derivative (dV125QdVi127qV125) of the absolute speed of the stator;

$$dCosPhi127QdVi127qV125 = \qquad (73)$$
$$\frac{1}{V127} * dVu127QdVi127qV125 - \frac{Vu127}{V127^2} * dV125QdVi127Qv125$$

The equation (73) gives the value (dCosPhi127QdVi127qV125) of the derivative of the cosine of the blade-pitch angle of the absolute speed of the stator;

$$dSinPhi127QdVi127qV125 = \qquad (74)$$
$$\frac{1}{V127} * dVz127QdVi127qV125 - \frac{Vz127}{V127^2} * dV125QdVi127qV125$$

The equation (74) gives the value (dSinPhi127QdVi127qV125) of the derivative of the sine of the blade-pitch angle of the absolute speed of the stator;

$$dCd125QdCl125 = \qquad (75)$$
$$(-1) * kL * ExpL * \cosh(DeltaClLow)^{ExpL-1} * \sinh(DeltaClLow) +$$
$$kR * ExpR * \cosh(DeltaClHigh)^{ExpR-1} * \sinh(DeltaClHigh) +$$

-continued $$(-1)*kClMNdd*\text{ceil}(DeltaMNdd)*(2*k2compCd*DeltaMNdd +$$

$$2*k12compCd*V0qUtipQdesCorr*DeltaMNdd)$$

The equation (75) expresses the derivative (dCd125QdCl125) of the drag coefficient relative to the lift coefficient using the parametric formulation of the polar chart. The function ceil( ) is a function which returns the smallest integer value greater than or equal to its argument; and $$dCtMap125QdVi127qV125 = \tag{76}$$

$$\left(\frac{V125}{V127}\right)^{-2}*\left(dCl125QdVi127qV125*\cos\left(Phi127*\frac{\pi}{180}\right)+\right.$$

$$Cl125*dCosPhi127QdVi127qV125 - dCd125QdCl125*dCl125QdVi$$

$$127qV125*\sin\left(Phi127*\frac{\pi}{180}\right)*Cd127*dSinPhi127QdVi127qV125\right)+$$

$$2*\left(\frac{V125}{V127}\right)^{-1}*\frac{1}{V125}*dV125QdVi127qV125*$$

$$\left(Cl125*\cos\left(Phi127*\frac{\pi}{180}\right)-Cd125*\sin\left(Phi127*\frac{\pi}{180}\right)\right)$$

The equation (76) expresses the derivative (dCtMap125QdVi127qV125) of the thrust of the stator using the definition of the thrust coefficient Ct125.

The FADEC 24 obtains the piloting equation by imposing that the value of the derivative (dCtMap125QdVi127qV125) expressed by the equation (76) is zero, namely the following equation (77):

$$\left(\frac{V125}{V127}\right)^{-2}* \tag{77}$$

$$\left(dCl125QdVi127qV125*\cos\left(Phi127*\frac{\pi}{180}\right)+Cl125*dCosPhi\right.$$

$$127QdVi127qV125 - dCd125QdCl125*dCl125QdVi127qV$$

$$125*\sin\left(Phi127*\frac{\pi}{180}\right)-Cd127*dSinPhi127QdVi127qV125\right)+$$

$$2*\left(\frac{V125}{V127}\right)^{-1}*\frac{1}{V125}*dV125QdVi127qV125*$$

$$\left(Cl125*\cos\left(Phi127*\frac{\pi}{180}\right)-Cd125*\sin\left(Phi127*\frac{\pi}{180}\right)\right)=0$$

The equation (77) then allows defining the blade-pitch angle that the stator should have, thereby guiding the regulation system and corresponds to the mathematical law (56) of FIG. 4.

Next, the mathematical formulation of the polar chart of a stator as well as the method for obtaining it is described.

The mathematical formulation of the polar chart of a stator is identical to the mathematical formulation of a rotor already set out, with the only difference that the appearance of the polar chart (Cl125 vs AoA127) expressing the lift coefficient as a function of angle of incidence no longer has a linear tendency, as is the case with a rotor, but a 3-order tendency.

Henceforth, the lift coefficient (Cl125) is expressed for a stator using the following equations:

$$k1Cl = \frac{k1Cl_{BASE}}{\sqrt{1-k2compKCl*\text{Mn}127^2}} \tag{78}$$

-continued $$k2Cl = \frac{k2Cl_{BASE}}{\sqrt{1-k2compKCl*\text{Mn}127^2}} \tag{79}$$

$$k2Cl = \frac{k2Cl_{BASE}}{\sqrt{1-k2compKCl*\text{Mn}127^2}} \tag{80}$$

$$Cl125 = k1Cl*\sin\left((AoA127-AoACl0)*\frac{180}{\pi}\right)+ \tag{81}$$

$$k2Cl*\sin\left((AoA127-AoACl0)*\frac{180}{\pi}\right)^2 +$$

$$k3Cl*\sin\left((AoA127-AoACl0)*\frac{180}{\pi}\right)^3$$

The mathematical formulation of the polar chart (Cd125 vs Cl125) giving the drag coefficient as a function of the lift coefficient is defined by the following equation (82), identical to the equation 41 used in the case of a rotor:

$$Cd125 = CDml + kL*\left(\cosh(DeltaClLow)^{ExpL}-1\right)+ \tag{82}$$

$$kR*\left(\cosh(DeltaClHigh)^{ExpR}-1\right)+AdderCdComp$$

The reset coefficients of the mathematical formulation of the polar chart Cl125 vs AoA127 and of the polar chart Cd125 vs Cl125 are specified in the tables of FIGS. 14 and 15, respectively.

The invention claimed is:

1. A turboprop engine comprising:

an actuator configured to control a blade pitch; and control device for a propulsion system, the control device comprising one or more processors, wherein the one or more processors are configured to determine a blade-pitch setpoint of at least one propeller of the propulsion system using a performance predictive model of the propeller taking account of at least one flight speed for adapting a blade pitch angle setpoint, wherein the performance predictive model of the propeller is configured to use polar charts implemented in the form of a mathematical law, comprising:

a first polar diagram giving a lift coefficient as a function of angle of incidence, relative Mach number, and a ratio between flight speed and peripheral speed of the propeller; and a second polar diagram giving a drag coefficient as a function of the lift coefficient, the relative Mach number, and the ratio between the flight speed and the peripheral speed of the propeller, wherein the actuator is configured to adapt the blade pitch depending on a difference between a measured instantaneous blade pitch angle and the blade pitch angle setpoint.

2. The turboprop engine according to claim 1, wherein the propulsion system comprises at least one element selected from among a rotor, a stator, an upstream rotor and a downstream rotor counter-rotating with respect to the upstream rotor, and a rotor and stator assembly, the rotor being located upstream of the stator.

3. The turboprop engine according to claim 1, wherein the performance predictive model of the propeller takes account of a measurement of the rotational speed of the propeller and a measurement of the mechanical torque of the shaft of the propeller.

4. The turboprop engine according to claim 1, wherein the performance predictive model of the propeller uses an optimisation mathematical law to define a blade-pitch setpoint for at least one stator.

5. The turboprop engine according to claim 1, wherein the one or more processors are configured to perform an iteration loop, a stop criterion of which is the convergence of a lift coefficient from a calculated value towards a value obtained by using the polar charts.

6. The turboprop engine according to claim 1, wherein the one or more processors are configured to perform an iteration loop having a stop criterion determined based on a convergence from a calculated value of the mechanical torque towards the measured mechanical torque.

7. The turboprop engine according to claim 1, wherein the polar charts are obtained by using a reset of the mathematical formulation with regards to target results obtained by three-dimensional numerical simulation or by wind tunnel tests.

8. The turboprop engine according to claim 1, wherein said device forms a module for a full-authority digital electronic controller.

9. The turboprop engine according to claim 1, further comprising a full-authority digital electronic controller comprising the control device.

10. An aircraft comprising a turboprop engine according to claim 1.

11. A method for controlling a propulsion system of a turboprop engine, comprising:

determining, by one or more processors, a blade-pitch setpoint of at least one propeller of the propulsion system, during which a step of predicting the performance of the propeller is performed taking account of at least one flight speed to adapt a blade-pitch angle setpoint, said prediction step being characterised by the use of the polar charts implemented in the form of a mathematical law, comprising:

a first polar diagram giving a lift coefficient as a function of angle of incidence, relative Mach number, and a ratio between flight speed and peripheral speed of the propeller; and a second polar diagram giving a drag coefficient as a function of the lift coefficient, the relative Mach number, and the ratio between the flight speed and the peripheral speed of the propeller; and adapting, by an actuator, a blade pitch of the turboprop engine depending on a difference between a measured instantaneous blade pitch angle and the blade pitch angle setpoint.

* * * * *